US006875407B1

(12) United States Patent
Biel, Jr. et al.

(10) Patent No.: US 6,875,407 B1
(45) Date of Patent: Apr. 5, 2005

(54) VACUUM-INSULATED EXHAUST TREATMENT DEVICE WITH PHASE CHANGE MATERIALS AND THERMAL MANAGEMENT SYSTEM

(75) Inventors: John Peter Biel, Jr., Grand Rapids, MI (US); Frederick B. Hill, Jr., Rockford, MI (US); Steven D. Burch, Honeoye Falls, NY (US); Terry R. Penney, Lakewood, CO (US)

(73) Assignee: Benteler Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/889,623

(22) PCT Filed: Jan. 21, 2000

(86) PCT No.: PCT/US00/01473

§ 371 (c)(1),
(2), (4) Date: Jul. 19, 2001

(87) PCT Pub. No.: WO00/43103

PCT Pub. Date: Jul. 27, 2000

Related U.S. Application Data

(60) Provisional application No. 60/116,839, filed on Jan. 22, 1999.

(51) Int. Cl.$^7$ .......................... B01D 53/34; B01D 53/92; F01N 3/28; F01N 7/14
(52) U.S. Cl. ...................... 422/179; 422/173; 422/174; 422/177; 422/180
(58) Field of Search ................................ 422/168–177, 422/179, 180; 60/299

(56) References Cited

U.S. PATENT DOCUMENTS

| 3,167,159 A | 1/1965 | Bovenkerk ................... 165/276 |
| 3,823,305 A | 7/1974 | Schroder ..................... 219/305 |
| 4,572,864 A | 2/1986 | Benson et al. ............ 428/305.5 |
| 4,702,853 A | 10/1987 | Benson et al. ................ 252/70 |
| 4,860,729 A | 8/1989 | Benson et al. .............. 126/400 |
| 5,163,289 A | 11/1992 | Bainbridge ................... 60/274 |
| 5,318,108 A | 6/1994 | Benson et al. ................ 165/96 |
| 5,477,676 A | 12/1995 | Benson et al. ................ 60/274 |

OTHER PUBLICATIONS

NREL Technology Brief, Keeping the Heat on Cold–Start Emissions, pp. 1–4, May 1996.*
Article entitled "GETTERING" an Integral Part of Vacuum Technology, by Dr. Paolo della Porta—SAES Getters S.p.A.; presented at American Vacuum Society 39th National Symposium, Nov. 9–13, 1992, Hyatt Regency.
Article entitled St 707 Non–Evaporable Getters Activatable at Low Temperatures, no date.
Article entitled St 101 non–evaporable getters, © 101 920630 Saes Getters S.p.A.

* cited by examiner

Primary Examiner—Hien Tran
(74) Attorney, Agent, or Firm—Price, Heneveld, Cooper, DeWitt & Litton, LLP (57) ABSTRACT

A thermally-activated exhaust treatment device, such as a catalytic converter (20) adapted to control exhaust emissions in a vehicle, includes a core having an inner housing (21) and a catalytic material (27) chosen to reduce undesirable emissions from the exhaust of a combustion engine. A jacket includes an outer housing (22) enclosing the inner housing (21) but characteristically not contacting the inner housing (21). The inner and outer housings (21, 22) include walls (30, 31) forming a vacuum-drawn sealed insulation cavity (26) around the inner housing (21). A chamber (60) positioned adjacent the inner housing (21) includes low melting point metal phase change material (61). A thermal management system is operably connected to the insulation cavity (26) that is constructed to control heat flow from the inner housing (21) to maximize the time the catalytic material (27) is within a predetermined optimum temperature operating range or limit catalyst maximum temperature.

24 Claims, 6 Drawing Sheets

VACUUM-INSULATED EXHAUST TREATMENT DEVICE WITH PHASE CHANGE MATERIALS AND THERMAL MANAGEMENT SYSTEM

This application claim benefit of 60/116,839 filed Jan. 22, 1999.

BACKGROUND OF THE INVENTION

The present apparatus relates to automotive exhaust systems, and more particularly relates to catalytic converters and particulate traps that are vacuum insulated and that have phase change materials to assist in retention of heat and further that are adapted to treat emissions, such as are found in gasoline engine exhaust and diesel engine exhaust.

Most vehicle exhaust systems and particularly exhaust systems of vehicles powered by internal combustion engines are equipped with engine exhaust treatment systems for reducing noxious emissions in exhaust gases. Engine exhaust treatment systems consist primarily of a catalytic converter which converts toxic exhaust emissions to non-toxic gases. The oxidative and reductive reactions that convert the emissions occur on the hot catalytically active surface of the converter. A problem exists in that a large part of tailpipe hydrocarbon emissions occur during the initial cold start phase when the catalytic converter is least effective. Until the converter is heated to a sufficiently high temperature, these reactions do not occur efficiently and exhaust gases pass through the system untreated. EPA estimates indicate that as much as 80% of all automobile commuter exhaust emissions occur during the so-called "cold start" period when the catalytic converter is heating up to operational temperature. Where there are oxides of nitrogen that must be reduced, such as in exhaust from diesel engines, there is an upper and lower operating range for optimal operation of the catalytic materials.

A vacuum-insulated catalytic converter with included thermal energy storage improves the efficiency of engine exhaust emissions treatment by remaining hot long after the engine is shut off. If the engine is not shut off for too long, the still hot and catalytically active converter is immediately effective the next time the engine is used and avoids the "cold start" emission of untreated exhaust gases. However, passive thermal energy storage systems have problems. In passive thermal energy storage systems, the thermal energy storage material is well connected thermally to the catalytic converter so that heat will readily flow from the thermal energy storage material to the catalytic converter when it requires heat. But when the converter has sat for a long time and the thermal energy storage material has cooled, this close coupling will draw heat from the hot exhaust gas stream and from the catalyst until the thermal energy storage material itself is heated to a high temperature. This will require some additional time during which untreated exhaust gases will be emitted. Thus, while the above-discussed design is effective in reducing "cold start" emissions when it is hot, it actually exacerbates the "cold start" problem whenever the converter has been allowed to cool. Notably, no matter how effectively the converter stores heat, there will be times when it has cooled and will suffer from some degree of "cold start" emissions.

At least one prior design converter utilized a salt Phase Change Material (PCM) for thermal energy storage. There are some fundamental problems in using a salt PCM. One problem is that the thermal conductivity of a salt is relatively low, resulting in extended vehicle driving times to fully melt the PCM and realize the full heat storage of the PCM. Another problem is the large thermal expansion of most salts from ambient temperature to elevated temperatures typical of an auto exhaust. This expansion can be as high as 30% which results in inefficient packaging since allowance must be made in the PCM container for this expansion. This is undesirable since the area under a vehicle is very confined and at a premium, particularly as vehicles are built to ride closer and closer to the road surface.

It is also known to actively manage a vacuum environment in a catalytic converter. For example, see Benson U.S. Pat. No. 5,477,676. However, the electrically heated and controlled hydrogen source disclosed in Benson U.S. Pat. No. 5,477,676 to prevent the converter from overheating requires complex and expensive wiring to the catalytic converter. This wiring and control system also adds to the vulnerability of the exhaust system to failure and increases the risk of a warranty liability or expensive model recall action by the manufacturer. This can be a serious problem, particularly given the severe environments that exhaust systems are subjected to.

Thermally-activated exhaust treatment devices also include particulate traps for capturing and treating particulate emissions, such as carbon particles and soot from diesel engines. Particulate traps work best at elevated temperature. Particulate traps are least effective at cold starts, which is when the problem of carbon particulate emissions and creation of soot is the greatest in diesel engines. Accordingly there are significant advantages to be achieved in particulate traps by vacuum insulating them to conserve and hold their temperatures longer upon engine shut off.

Accordingly, an exhaust treatment device is desired solving the aforementioned problems and offering the aforementioned advantages.

SUMMARY OF THE INVENTION

In one aspect of the present invention, a thermally-activated exhaust treatment device is provided, such as a catalytic converter adapted to control exhaust emissions in a vehicle. The exhaust treatment device includes an inner housing having a first inlet and a first outlet defining a longitudinal direction and having an exhaust treatment device therein chosen to reduce undesirable emissions from exhaust of a combustion engine as the exhaust passes from the first inlet to the first outlet. The device further includes an outer housing enclosing the inner housing but characteristically not contacting the inner housing. The outer housing includes a second inlet and a second outlet that aligns with the first inlet and the first outlet of the inner housing. The inner and outer housings includes walls forming a sealed insulation cavity around the inner housing, with the insulation cavity having a vacuum drawn therein. An intermediate housing is positioned adjacent to the inner housing that includes metal phase change material.

In another aspect of the present invention, a thermally-activated exhaust treatment device is provided, such as a catalytic converter adapted to control exhaust emissions from a diesel engine. The device includes an inner housing having a first inlet and a first outlet defining a longitudinal direction and having an exhaust treatment device therein chosen to reduce undesirable emissions in exhaust of a diesel engine as the exhaust passes from the first inlet to the first outlet. The device further includes an outer housing enclosing the inner housing but characteristically not contacting the inner housing. The outer housing includes a second inlet and a second outlet that aligns with the first inlet an the first outlet of the inner housing. The inner and outer housings include walls forming a sealed insulation cavity around the inner housing, with the insulation cavity having a vacuum drawn therein. A thermal management system is operably connected to the insulation cavity that is constructed to control heat flow from the inner housing to maximize the time the catalytic material is within a predetermined optimum temperature operating range that includes an upper limit and a lower limit.

These and other feature, advantages, and objects of the present invention will be further understood and appreciated by those skilled in the art by reference to the following specification, claims, and appended drawings.

DETAILED DESCRIPTION OF PREFERRED EMBODIMENTS

The illustrated catalytic converter 20 (FIG. 1) is a vacuum-insulated converter having an inner housing 21 positioned within and insulated from an outer housing 22. Expansion joints 23 and 24 are provided at each end of the inner housing 21, and supports 25 and 25' are provided to support the inner housing 21 within the outer housing 22 while maintaining a cavity 26 forming a relatively constant gap around the inner housing 21. A sufficient vacuum is drawn on the cavity 26 so as to minimize heat loss from air conduction and convection. The supports 25 and 25' within the converter design are particularly configured to accommodate longitudinal thermal expansion of the hot inner housing 21 relative to the cool outer housing 22. The internal supports 25 and 25' bridge the vacuum insulation and are sufficiently stiff to accommodate dynamic (vibration and impact) loads at temperature, yet are flexible enough to accommodate unequal thermal expansion of the inner and outer housings 21 and 22, and further are of minimal cross-sectional size and minimal conductance to minimize heat loss.

Figure 1:
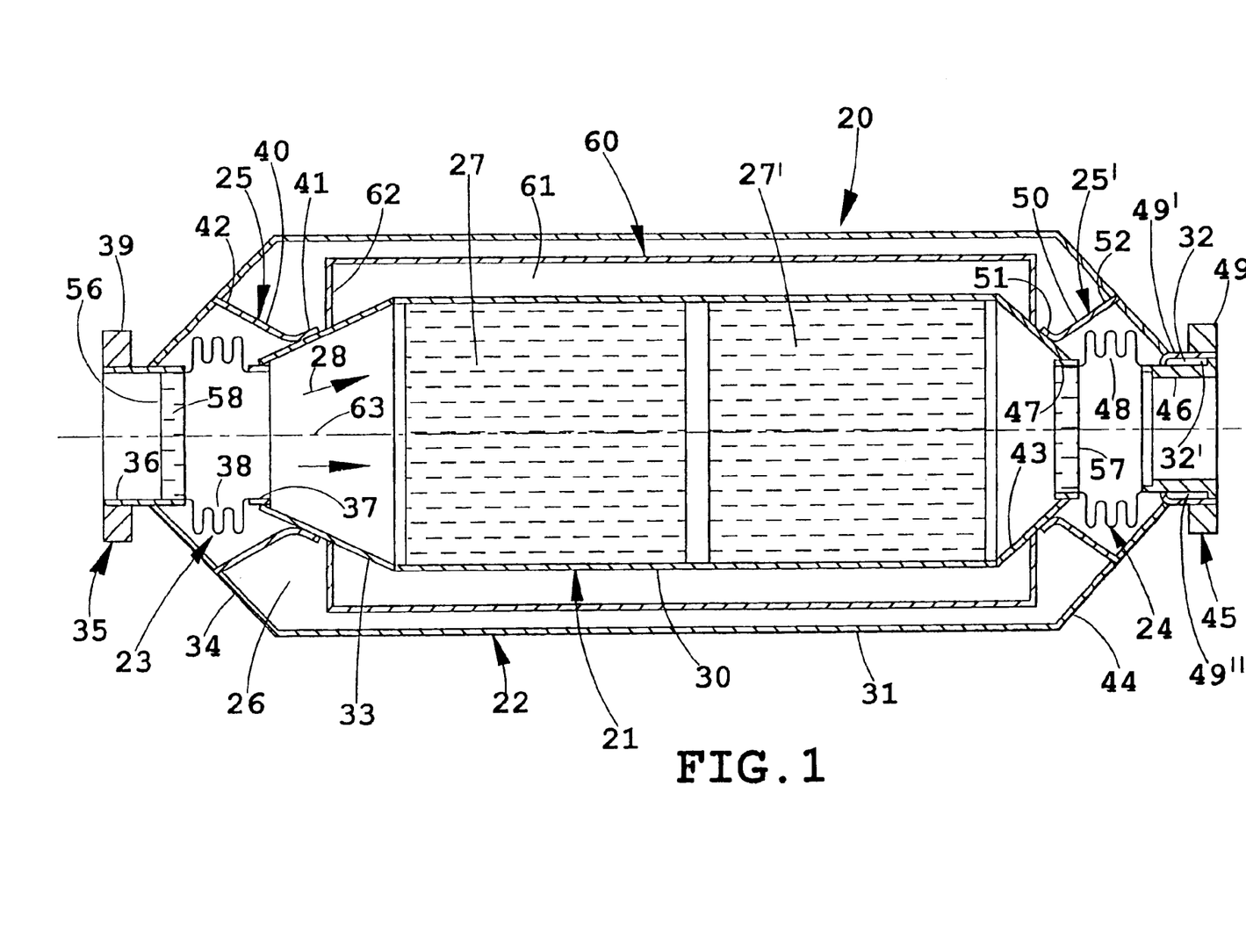
FIG. 1 is a side cross-sectional view of a catalytic converter embodying the present invention.

More specifically, the inner housing 21 is preferably fabricated of metal or other material that is impermeable to gases, and is adapted to contain one or more catalyst substrates 27 and 27'. Exhaust gases from an internal combustion engine flow through the catalytic converter 20, as indicated by the arrows 28, including through the numerous small, catalyst-coated pores or channels that are formed in the catalytic substrates 27 and 27'. The inner housing 21 is enclosed within the outer housing 22, and its sidewall 30 is spaced radially inwardly from the sidewall 31 of the outer housing with the supports 25 and 25' supporting it to maintain a relatively constant gap. The outer housing 22 is also preferably fabricated of metal or other material that is impermeable to gases, even in hot and high-order vacuum environments. The annular space or cavity 26 formed between the inner and outer housings 21 and 22 is evacuated to form a sufficient vacuum. The insulating performance of the annular space or cavity 26 is variably controlled by a temperature sensitive hydrogen source device 32 that includes a hydride material, and the vacuum is maintained by a separate vacuum maintenance device 32' that includes a getter material, as discussed below.

A funnel-shaped inner inlet end cone 33 is attached to the inlet end of the sidewall 30 of the inner housing 21, and a funnel-shaped outer inlet end cone 34 is attached to inlet end of the sidewall 31 of the outer housing 22. An inlet subassembly 35 includes an inlet tube section 36 attached to the open end of the outer inlet end cone 34, and an inlet tube section 37 attached to the open end of the inner inlet end cone 33. A bellows 38 is attached between the inner and outer inlet tube sections 36 and 37, the bellows 38 being configured to allow dissimilar longitudinal thermal expansion of the inner and outer housings 21 and 22. An end of the inlet tube section 36 projects from the outer inlet end cone 34, and an annular attachment flange 39 is secured to the inlet tube section 36 for attaching the catalytic converter 20 to an engine exhaust pipe. The illustrated supports 25 extend from the outer inlet end cone 34 to the inner inlet end cone 33 at a plurality of circumferentially spaced positions. The supports 25 include a spokes 40 and hub and rim flanges 41 and 42 that abut and are joined to the inner and outer inlet end cones 33 and 34.

A funnel-shaped inner outlet end cone 43 is attached to the outlet end of the sidewall 30 of the inner housing 21, and a funnel-shaped outer outlet end cone 44 is attached to the outlet end of the sidewall 31 of the outer housing 22. An outlet subassembly 45 includes an outlet tube section 46 attached to the open end of the outer outlet end cone 44, and an outlet tube section 47 attached to the open end of the inner outlet end cone 43. A bellows 48 is attached between the inner and outer outlet tube sections 46 and 47, the bellows 48 being configured to allow dissimilar longitudinal thermal expansion of the inner and outer housings 21 and 22. An end of the outlet tube section 46 projects from the outer outlet end cone 44. It includes a tube 49' shaped to form an annular space 49" for holding getter and/or hydride material. An annular attachment flange 49 is secured to the outlet tube section 46 for attaching the catalytic converter 20 to an engine manifold exhaust pipe. The illustrated supports 25' extend from the outer outlet end cone 44 to the inner outlet end cone 43 at a plurality of circumferentially spaced positions. The supports 25' include a spokes 50, a hub flange 51, and a rim flange 52 that abut and are welded to the inner and outer inlet end cones 43 and 44. The illustrated reinforcement tube 49' and outlet tube section 46 are fixed together. The hydride material recaptures hydrogen from the insulating cavity 26 when the catalytic converter 20 is at a low temperature to increase the insulating effect of the vacuum at low temperature (which helps the catalytic converter reach its operating temperature more quickly) and releases hydrogen to increase conductivity when the catalytic converter 20 is at a high temperature (to prevent over-heating). The getter material removes gases from the cavity 26, and helps maintain the high order vacuum in the cavity 26 for a longer service life. It is noted that many different getter/hydride arrangements and structures are possible, as shown in provisional application Ser. No. 60/116,829, previously incorporated by reference.

End shields 56 and 57 are placed in the inlet and outlet outer tube sections 36 and 46, respectively, adjacent an outer end of the bellows 38 and 48. The end shields 56 and 57 include a plurality of holes 58 that reduce turbulence in the flow of exhaust gases through the catalytic converter 20, and also the end shields 56 and 57 slow convection heat transfer and help retain the heat within the catalytic converter 20 when the flow of exhaust stops. Further the end shields 56 and 57 may include catalytic material themselves if desired.

A phase-change-material (PCM)-containing intermediate housing 60 including annular end walls 62 is attached to the sidewall of the inner housing 21 in the cavity 26, and forms a sealed separate chamber around the inner housing 22. Phase change material 61 is placed in the chamber of housing 60. The phase change material 61 is formulated to change its phase and absorb thermal energy during the heat-up period for the catalytic converter, and further is configured to release heat during cool-down of the catalytic converter 20. The result is that the phase change material 61 causes the inner housing 21 and catalytic materials 27 and 27' to reach their "light off" temperatures much more quickly. Once the catalytic materials reach the "light off" temperature (usually about 315 to 430 degrees C.), the temperature of the catalytic converter 20 raises rapidly to its operating temperature from the exothermic heat of the catalytic reactions with the exhaust gases.

The outer inlet end cone 34 forms an angle to a longitudinal direction, and the inner inlet end cone 33 forms an angle to the longitudinal direction 63, with both the outer and inner inlet end cones opening up as the exhaust gases flow into the catalytic converter 20. The spoke-like bodies 40 of the illustrated supports 25 at the inlet end extend at an angle of about 45 degrees from the longitudinal direction 63, such that they interconnect the cones 33 and 34. The spoke-like bodies 50 of the illustrated supports 25' at the outlet end extend at an angle of about 45 degrees from the longitudinal direction 63, but they extend in an opposite direction to the cones 43 and 44 such that they interconnect the cones 43 and 44. The spoke-like bodies 40 and 50 of the supports 25 form spokes that are circumferentially spaced around the bellows 38 and 48, and there are sufficient spoke-like bodies 40 and 50 such that the inner housing 21 is stably supported within the outer housing 22 for non-contacting concentric support. The appearance in end view is much like a spoked wheel. The combination of the spoke-like bodies 40 with the cones 33 and 34 at the inlet end, and the spoke-like bodies 50 with the cones 43 and 44 at the outlet end, form a support structure capable of maintaining support on the inner housing 21 while still accommodating the different thermal expansion of the inner housing 21 relative to the outer housing 22 (particularly in a longitudinal direction). As illustrated, the spoke-like bodies 40 at the inlet end are longer than the spoke-like bodies 50 at the outlet end. A scope of the present invention is believed to include both configurations, and variations thereof.

Figure 5:
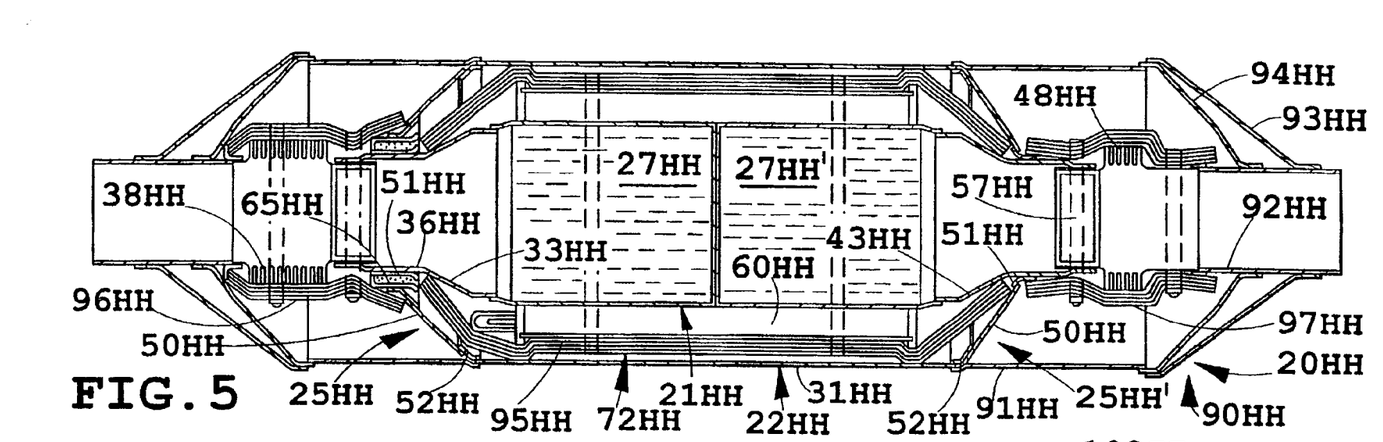
FIG. 5 is a side cross-sectional view of a modified catalytic converter having a modified end support system that facilitates manufacture.
Figure 6:
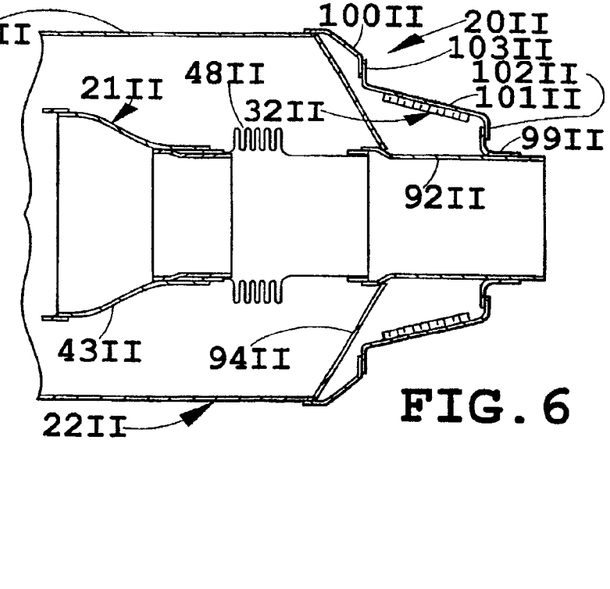
FIG. 6 is an enlarged fragmentary view of a modified end construction similar to the end construction shown in FIG. 5.
Figure 7:
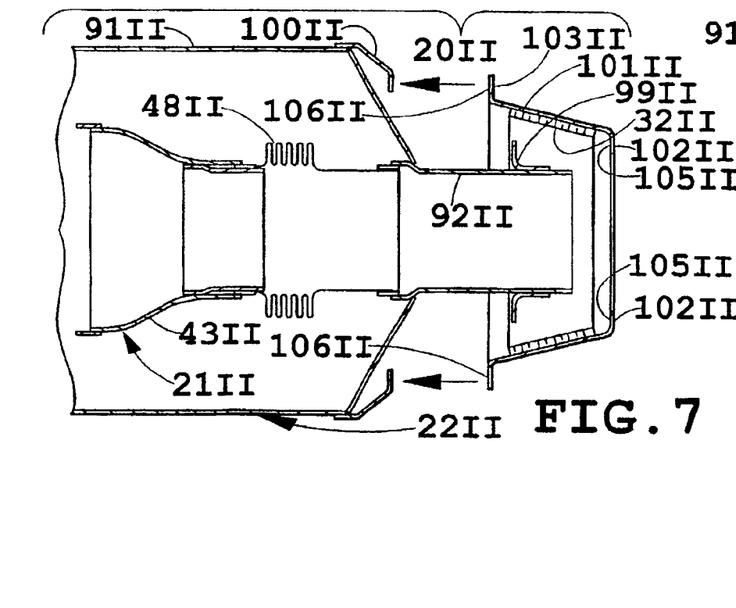
FIG. 7 is an exploded view of FIG. 6.

When the catalytic converter 20 is in a cooled state and the exhaust gases begin to flow (i.e. when the engine is started), the inner and outer housings 21 and 22 will gradually heat, with the inner housing 21 heating much sooner and faster. As it heats, the inner housing 21 will lengthen by several millimeters ahead of the outer housing 22. The outer housing 22 also heats, but at a slower rate and with a delayed time period and also to a lower highest temperature. This causes longitudinally directed stress to occur on the supports 25 and 25'. The curvature of attachment flanges 41 and 51 to the bodies 40 and 50, respectively, and their general shape and angular attachment cause the bodies 40 and 50 to bend into a curvilinear/concave shape, and causes them to do so simultaneously and predictably as the inner and outer housings 21 and 22 undergo different thermal expansions. The pressure of supports 25 and 25' can also cause the outlet end cones 43 and 44 to bow slightly apart from each other, depending on the strength of the supports 25 and 25'. By this predictable bending, the cavity 26 is reliably maintained around the inner housing 21 such that it does not contact the outer housing 22. The illustrated arrangement of FIG. 1 including supports 25 and 25' works well in some applications, but it is noted that the constructions of FIGS. 5–7 are considered more reliable.

The cross-sectional shape of the supports 25 and 25' is made sufficient to provide the functional strength required to hold the inner housing 21 in its isolated position within the outer housing 22, but the cross-sectional shape is minimized to reduce heat transfer along the supports 25 and 25'. The cross-sectional shape of the supports 25 and 25' vary greatly depending upon a weight of the inner housing 21 and components therein, depending upon loading (vibrational and impact) test requirements of the vehicle manufacturer, and depending upon test results and fine-tuning of the exhaust system on a given model vehicle. For example, the spokes can be made from 1.5 mm thick by 4.0 mm wide stainless steel material (such as Inconel material) where at least three or more supports 25 (and 25') are used circumferentially around the inlet and outlets of the catalytic converter 20.

NEW PHASE CHANGE MATERIALS (PCM) FOR USE IN CATALYTIC CONVERTERS

The present disclosed arrangements use phase change materials (PCMs) to efficiently store heat in the catalytic converter. PCMs include large latent heat of fusion or heat of vaporization characteristics. By utilizing a PCM, a material-latent heat of fusion can substantially increase the heat released, such as by 33 to 50%.

A low melting point metal PCM with a high heat storage has been developed for use in catalytic converters of gasoline-fueled internal combustion engines. The metal PCM material is placed in the intermediate housing 60 in a position adjacent the inner housing 21 (or inner housing 21A of FIG. 2, or inner housing 21B of FIG. 3). The present novel metal PCM has greatly improved characteristics compared to salt PCMs. Metals have greater than 50 times the thermal conductivity of a salt, allowing them to absorb heat faster. Also, the thermal expansion of the metal PCM up to a typical exhaust temperature is in the 5–8% range, which is considerably below the expansion of salt. To effectively use metals in a catalytic converter, the melting point should be below 400 degrees C. and have a high heat of fusion. Most low melting point metals have a low heat of fusion and additionally are heavy and commonly toxic. However, the present invention includes a novel metal PCM containing Zinc (Zn), Magnesium (Mg), Aluminum (Al), and Silicon (Si). All four elements used are light, non-toxic, recyclable, and inexpensive materials. The proper combination of these elements results in a low melting point material with a high heat of fusion. The typical ranges for the elements in the PCM are Zn (35–55%), Mg (35–55%), Al (2–20%), Si (0–15%). The melting point range is preferably about 339–350° C., and most preferably at about the eutectic temperature of about 340° C. This PCM was developed to match a typical light-off temperature for an automotive three-way catalyst, such as is commonly used in catalytic converters of modern passenger vehicles. Also, this metal PCM was selected specifically for its properties of better thermal conductance and lower thermal expansion compared to salt PCMs.

A low melting point salt PCM with a relatively good heat storage has been developed for use in catalytic converters of diesel internal combustion engines, such as are often used in trucks and tractors. The salt PCM material can be placed in the intermediate housing 60 in a position adjacent the inner housing 21 (or inner housing 21A of FIG. 2, or inner housing 21B of FIG. 3). The salt PCM comprises a Lithium Nitrate ($LiNO_3$) material. The melting point of this salt is about 250 degrees C., which is the optimal operating temperature for catalytic converters intended for Oxides of Nitrogen ($NO_x$) emissions, a pollutant found in diesel engine exhaust.

Figure 4:
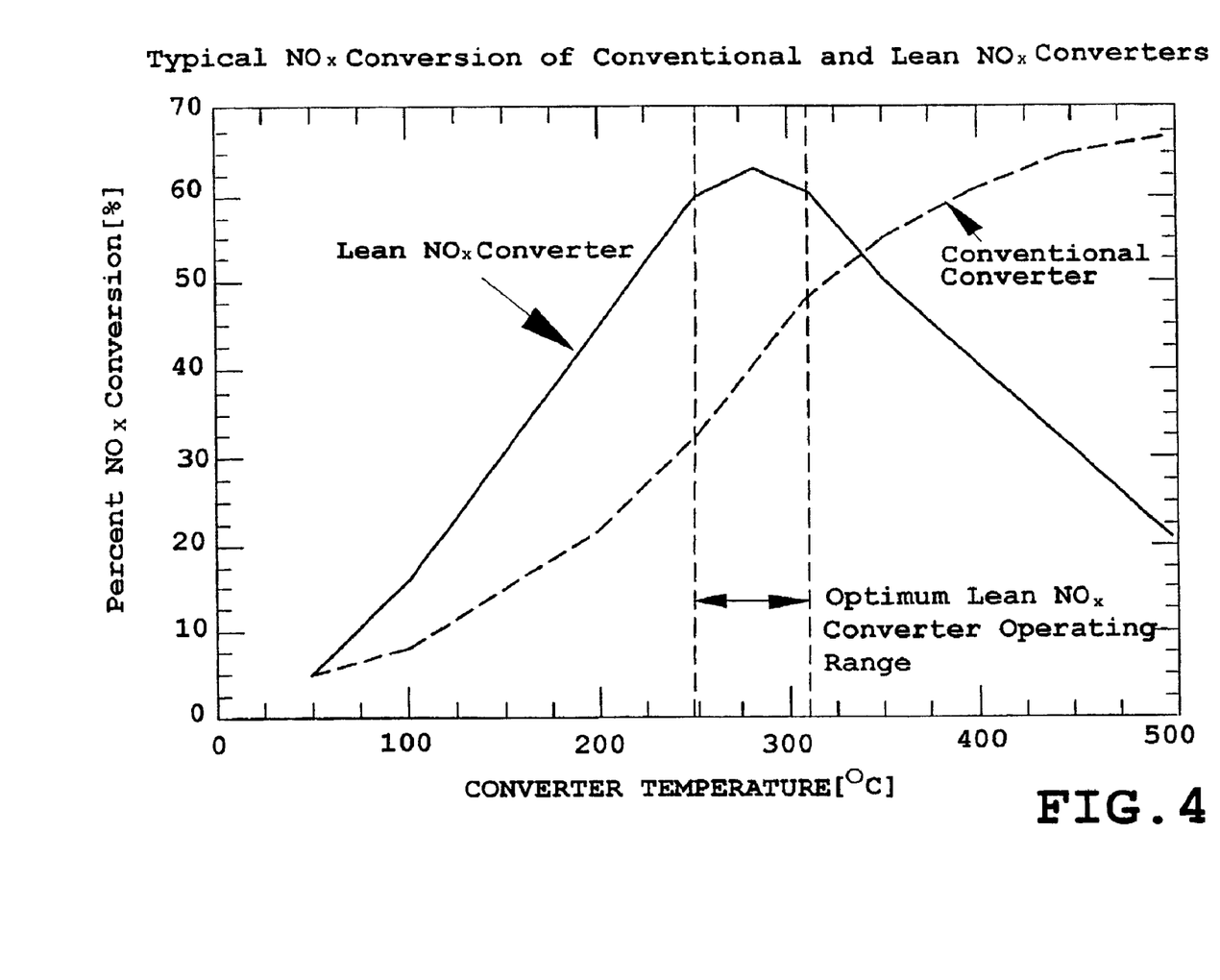
FIG. 4 is a graph showing percent conversion of $NO_x$ emissions in diesel exhaust versus converter temperature.

It is noted that by using two different PCM materials, the upper and lower bounds of a desired temperature range can be thermally managed. Specifically, FIG. 4 shows that it is desirable to maintain the temperature range for Lean $NO_x$ converters (discussed below) in the temperature range of about 250 degrees C. to about 310 degrees C. It is conceived that two PCMs could be used, one having a melt point at 250 degrees C. and the other having a melt point at 310 degrees C. Thus, when an operating temperature began to vary from a temperature within the desired operating range to a temperature out of the range, one of the PCM materials would change phase to keep the operating temperature in the desired range.

THERMAL MANAGEMENT OF LEAN $NO_x$ AUTOMOTIVE CATALYTIC CONVERTERS

Unlike known automotive catalytic converters, new converters are being developed, primarily for diesel engines, that are effective at reducing oxides of nitrogen ($NO_x$) to $N_2$ under fuel-lean (oxygen-rich) conditions. These "lean $NO_x$" converters have unique and relatively narrow operating temperature requirements (see attached FIG. 4). Specifically, the operating temperature range is about 200 degrees C. to about 400 degrees C. (which produces a percent conversion of $NO_x$ emissions of about 40% or above), and more preferably from about 250 degrees C. to about 310 degrees C. (which produces a percent conversion of $NO_x$ emissions of about 60% or above). To promote optimum efficiency of lean $NO_x$ converters, a catalytic converter thermal management system has been developed that incorporates vacuum insulation and phase change heat storage. The thermal conductivity of the vacuum insulation can be actively or passively controlled to allow or restrict heat flow from the converter, maximizing the time the converter is within its optimum temperature operating range.

Two additional catalytic converters are disclosed below. In order to reduce redundant discussion, similar and identical features and components of each successive modification are identified with the same identification numbers as in the earlier described embodiment, but with the addition of a letter, such as "A", "B", HH, etc.

The catalytic converter 20A (FIG. 2) includes an active thermal management system operably connected to the insulation cavity. The active thermal management system controls the heat flow from the inner housing 21A and catalytic material 27A and 27A' by controlling the amount of hydrogen in the vacuum insulated cavity 26A, and further by controlling active heat removal from the outer housing 22A via coolant. An electrical circuit 90A including wires 91A, 92A, and 93A that extend between a heater 94A, a source of energy 95A and a switch 96A. The switch 96A is controlled by operative connection to a microprocessor controller 97A on the vehicle. A hydride-filled chamber 98A is positioned on outer housing 22A and is in communication with the vacuum insulation cavity 26A. A sensor 99A on the catalytic converter 20A is connected to the controller 97A. The controller 97A senses a temperature of the catalytic converter 20A via the sensor 99A and turns the heater 94A on (or off), based on a program within the controller 97A that considers the catalytic converter's temperature and other vehicle parameters. When the catalytic converter 20 has reached its "light-off" temperature or when the controller 97A otherwise determines that a control action is required to increase heat loss, the heater 94A is turned "on" to cause a hydride material to release hydrogen into the vacuum insulation cavity 26A. This increases the conductivity of the insulation cavity 26A, causing the catalytic converter 20A to throw off (shed) more heat. When the controller 97A determines that a control action is required to reduce heat loss, the heater 94A is turned "off", which causes the hydride material to reabsorb hydrogen. This reduces the conductivity of the insulation cavity 26A due to the loss of hydrogen in the cavity 26A.

Figure 2:
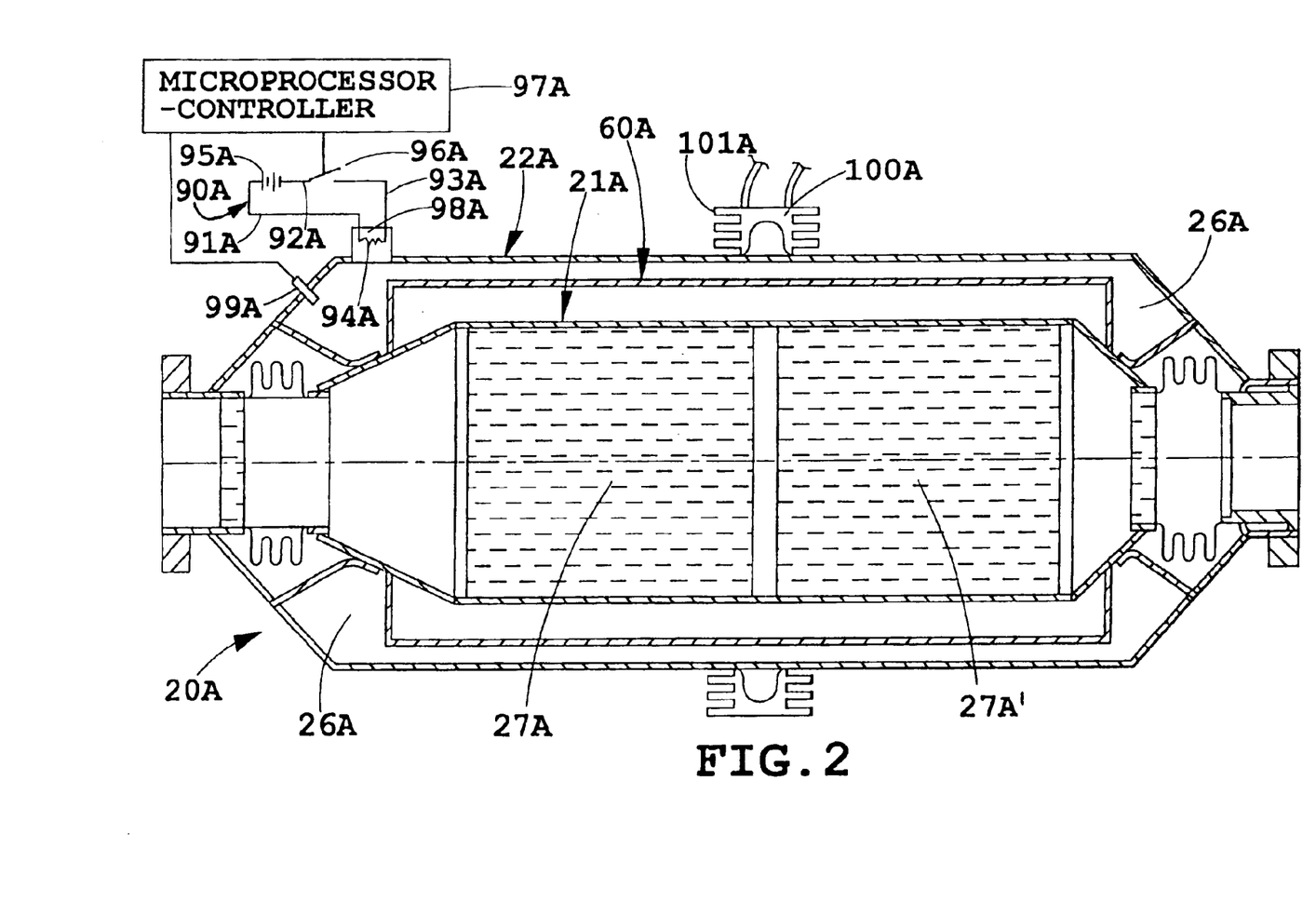
FIG. 2 is a side cross-sectional view of a modified catalytic converter similar to FIG. 1, but including an active thermal management system including an electrically heated metal hydride and an active heat removal system with coolant.

The active thermal management system further controls active heat removal from the outer housing 22A via coolant 100A that flows through a coolant jacket 101A attached to the outer housing 22A. This coolant 100A is connected to a heat-dissipating device, such as a radiator or the like.

The catalytic converter 20B (FIG. 3) includes a passive thermal management system operably connected to the insulation cavity. Like the active thermal management system, the passive thermal management system controls the heat flow from the inner housing 21B and catalytic material 27B and 27B' by controlling the amount of hydrogen in the vacuum insulated cavity 26B, and further by controlling heat removal from the outer housing 22B. Hydride material is placed in a temperature sensitive hydrogen source device 32B located between the outlet tube section 46B and reinforcement tube 49B', and is retained in place by an apertured and porous ring-shaped retainer on the end facing the insulating cavity 26B. The hydride is activated by temperature, releasing hydrogen as a function of temperature of the catalytic converter 20B. The addition of hydrogen increases the thermal conductance of heat across the cavity 26B. As known in the art, the value of the thermal conductance is a function of the gas pressure within the cavity 26B. When the catalytic converter 20B temperature drops, the hydride reabsorbs hydrogen, causing the insulating cavity 26B to increase its insulative value. It is noted that there is a known relationship between hydrogen pressure and thermal conductivity, including optimal zones where the greatest conductivity changes take place. These are known in the art (and are publicly available) such that they need not be disclosed herein for an understanding of the present invention.

Figure 3:
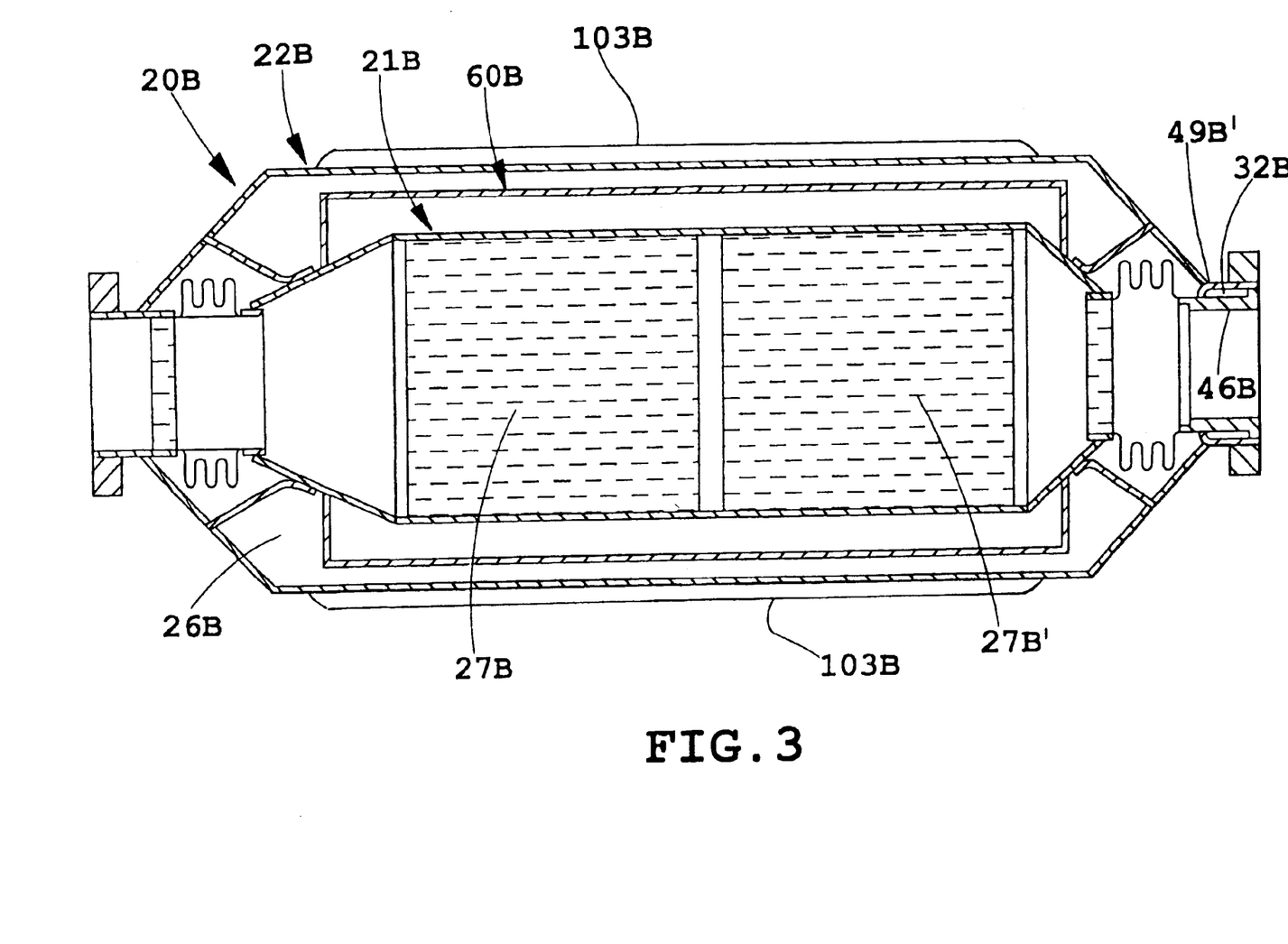
FIG. 3 is a side cross-sectional view of a modified catalytic converter similar to FIG. 1, but including a passive thermal management system including a temperature-activated passive metal hydride and a passive cooling fins.

Additional passive thermal management can be done by including longitudinally-extending air-cooling fins 103B that lose increasing amounts of heat as the temperature of the outer housing 22B increases. The fins 103B can be different designs and locations, but their base preferably is well-connected to the outer housing for good heat conductance.

MODIFIED CATALYTIC CONVERTER STRUCTURE

A modified catalytic converter 20HH (FIG. 5) includes a support 25HH at its inlet end having an inner ring flange or hub 51HH, an outer ring flange or rim 52HH, and spokes 50HH connecting the hub 51HH to the rim 52HH. The outer ring flange 52HH has wire mesh feet ring 65HH that slidably engage the inner inlet tube section 36HH of the inner housing 21HH to permit relative longitudinal expansion of the inner housing 21HH to the outer housing 22HH without undesirable distortion of components. The catalytic converter 20HH further includes a support 25HH' at its outlet end having an inner ring flange or hub 51HH, an outer ring flange or rim 52HH, and spokes 50HH extending between the hub 51HH and the rim 52HH. The support 25HH' at the outer end provides a fixed support for the inner housing 21HH, such that the resulting greater longitudinal expansion of the inner housing 21HH over the outer housing 22HH due to dissimilar thermal expansion occurs at the inlet end.

An end construction 90HH at the outlet end is particularly constructed to facilitate manufacture of the catalytic converter 20HH and to maintain a very good thermal barrier. The end construction 90HH includes a cylindrical wall extension 91HH that sealingly engages and is welded to the wall 31HH of the outer housing 22HH. The end construction 90HH further includes a separated and extended outlet tube section 92HH that extends from bellows 48HH. The extended outlet tube section 92HH, in effect, replaces the inner outlet tube section (46) (FIG. 1) and serves a similar attachment function for connection to an exhaust pipe of the vehicle. First and second extended cone sections 93HH and 94HH extend from the wall extension 91HH. The cone sections 93HH and 94HH have ring-shaped inner ends that overlap onto each other and onto the wall extension 91HH to form a rigid, sealed connection to the outer housing 22HH. The cone sections 93HH and 94HH have outer ends that are spaced apart from each other and that engage opposing ends of the extended outlet tube section 92HH. The cone sections 93HH and 94HH hold the outlet tube section 92HH in alignment with the bellows 48HH at an end of the bellows 48HH. The inner (i.e. second) cone section 94HH includes spokes or vacuum communication ports/apertures permitting hydrogen gas to flow through the inner cone section 94HH. The first (i.e. outer) cone section 93HH is continuous and funnel-shaped so that the vacuum can be held in the cavity 26HH. The combination of the spokes 50HH and the cone sections 93HH and 94HH at the outlet end of the catalytic converter 20HH provide a very stable and sturdy structure for supporting the inner housing 21HH.

A radiation shield 72HH is provided in three sections, including a center section 95HH that wraps around and covers the phase change material housing 60HH, and end sections 96HH and 97HH that wrap around and cover the inlet and outlet ends of the converter 20HH (including the bellows 38HH and 48HH). It is noted that the end sections 96HH and 97HH overlap onto longitudinal edges of the center section 95HH to provide maximum radiation-resisting values, yet their overlapping joindure allows the spokes 50HH at each end to extend out from the inner housings 21HH to the outer housing 22HH. The inlet end section of the catalytic converter 20HH is similar to the outlet end section, and its description need not be repeated in order for a person of ordinary skill to understand the present construction, nor for such a person to understand the inventive aspects thereof.

The catalytic converter 20II (FIGS. 6 and 7) includes an outlet end section similar to that of catalytic converter 20HH, but the catalytic converter 20II includes a vacuum maintenance device 32II that includes getter material for maintaining a high vacuum in the cavity 26II. Alternatively, or at the same time, the vacuum maintenance device 32II may include hydride material for passively increasing the amount of hydrogen gas within the cavity 26II when the inner housing 21II heats up. By increasing hydrogen gas at high temperature, the insulative value of the vacuum cavity 26II is reduced, thus helping throw off and to prevent overheating of the catalytic converter 20II. By reducing hydrogen gas at low temperature, the insulative value of the vacuum cavity 26II is increased, thus assisting in faster heat up of the catalyst in the catalytic converter 20II during initial engine starts. Notably, the device 32II is positioned relatively close to the outlet tube 92II such that it quickly receives and absorbs heat from hot gases passing through the catalytic converter 20II. These hot gases are indicative of the temperature of the catalyst material in the catalytic converter 20II. As a result, the device 32II is able to quickly respond to actual temperature conditions of the catalytic material, which can be important to good operation. Notably, the device 32II can also be positioned at the inlet end of the catalytic converter 20II instead of the outlet end.

In order to quickly and economically achieve a high vacuum in the cavity 26II, it is necessary to bake the catalytic converter 20II at high temperature so that gases and volatile agents are driven off. However, hydride materials, which release hydrogen at high temperatures, are undesirably activated to release their hydrogen at the same high temperatures necessary for a good bake-out. Further, after the bake-out, the cavity 26II must be sealed to maintain the vacuum. A problem occurs in that it is difficult to bake-out a cavity 26II and then seal the cavity 26II to maintain the high vacuum, without also prematurely activating the getter and hydride materials. The end construction shown in FIG. 6 solves this problem.

As shown in FIG. 7, the end construction of FIG. 6 replaces the outer end cone (93HH) with an inner ring flange 99II, an outer ring flange 100II, and a frustoconically-shaped member 101II (sometimes called a "cover"). The frustoconically-shaped member 101II includes an "in" flange 102II and an "out" flange 103II. The inner ring flange 99II is attached to an outer end of the extended outlet tube section 92II that extends from bellows 48II, and flares outwardly. The outer ring flange 100II is attached to the cylindrical wall extension 91II of outer housing 22II. The components of catalytic converter 20II are baked off as shown in FIG. 7, with the cover member 101II held away from the "main" components of the catalytic converter 20II. After bake-out, the "in" flange 102II is shaped to engage the inner ring flange 99II when the frustoconically-shaped member 101II is brought into engagement with the end of the outer housing 22II. The "out" flange 103II is shaped to simultaneously engage the outer ring flange 100II when the frustoconically-shaped member 101II is brought into engagement with the outer housing 22II. This simple movement of parts in a longitudinally aligned direction is easily achieved, even while the parts are continuously held in the high vacuum after bake-out. Once the frustoconically-shaped member 101II is engaged with the outer housing 22II, the bake-out temperature is increased sufficiently to melt brazing material 105II located on the "in" flange 102II to seal the "in" flange 102II to the inner ring flange 99II, and to melt brazing material 106II on the "out" flange 103II to seal the "out" flange 103II to the outer ring flange 100II.

The hydride and/or the getter material of device 32II is located on an inside of the body of the frustoconically-shaped member 101II. Notably, the frustoconically-shaped member 101II is separated from inner and outer housings 21II and 22I of the catalytic converter 20II and related components during the bake-out. By directing the heat of the bake-out at the inner and outer housings 21II and 22II and at the related components of that subassembly (and by keeping the subassembly that includes the hydride and getter materials at a cooler lower temperature), the properties and characteristics of the hydride and getter material are preserved so that they are not wasted. (i.e. The hydrogen of the hydride is not prematurely driven off, and the gas sorbing capacity of the getter is not prematurely used up.) Once the bake-out is complete and the subassembly of the frustoconically-shaped member 101II is brought into engagement with the ring flanges 102II and 103II, additional heat is applied to the assembly that is focused to melt the brazing material 105II and 106II. It is noted that this additional heat may activate the getter material, but this is not a problem since the bake-out has already occurred and the cavity 26II is sealed. Thus, when the getter material cools and become active, it merely begins doing its intended job, which is to absorb gas to maintain the high vacuum. It is noted that this additional heat may also activate the hydride material, but this is not a problem since, as noted above, the bake-out has already occurred and the cavity 26II is sealed. Thus the hydride material merely begins doing its intended job, which is to release hydrogen into the cavity 26II when the hydride is at an elevated temperature.

PARTICULATE TRAP FOR DIESEL EMISSIONS

A particulate trap 160JJ (FIG. 8) is often used to trap soot and carbon particulates in the exhaust from diesel engines and to burn off these particles in a safe and non-polluting manner. The present technology can also be used in particulate traps, as described below. The detail of particulate traps and their operation is not needed for an understanding of the present invention. It is sufficient to know that particulate traps require considerable heat and have a relatively high operating temperature for optimal operation. During cold starts, when the particulate trap is cold, it is inefficient and does not operate effectively. Accordingly, all of the discussion above in regard to providing thermal control and management of the vacuum cavity applies, including the discussion relative to PCM materials, vacuum atmospheric/hydrogen control and insulative control, and reflective shields.

Figure 8:
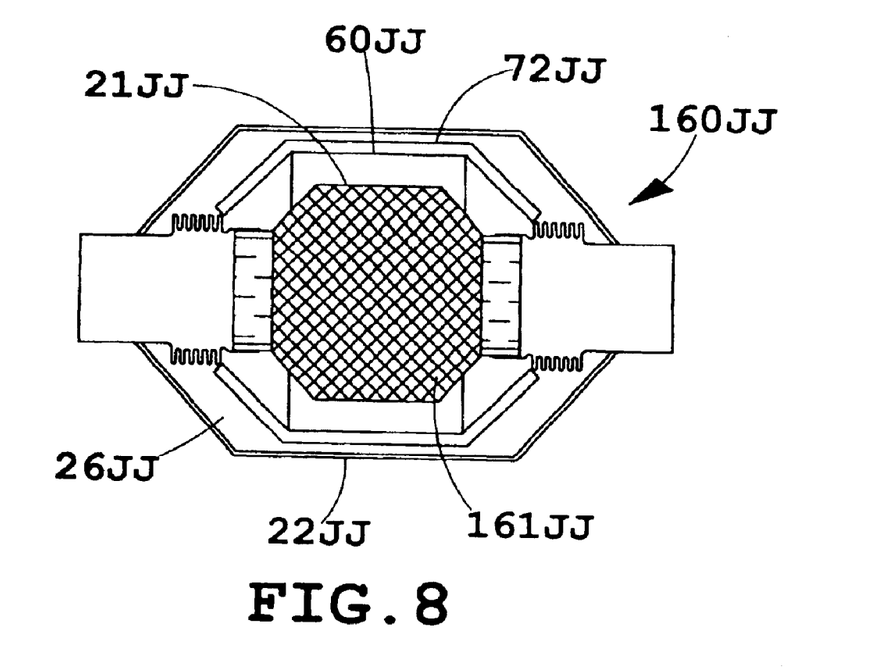
FIG. 8 is a side schematic view of a particulate trap used for trapping soot from a diesel exhaust.

Particulate trap 160JJ is similar to the converter structure 20 in that the particulate trap 160JJ includes inner and outer housings 21JJ and 22JJ spaced apart to define a vacuum cavity 26JJ. The inner and outer housings 21JJ and 22JJ include inlet and outlet ends where exhaust is received and emitted, respectively. An intermediate housing 60JJ holds PCM material adjacent the inner housing 21JJ. Getter material is provided to maintain the vacuum in the cavity 26JJ for a long service life. Hydride materials are provided to emit hydrogen once an operating temperature is achieved so that the particulate trap does not overheat. Radiation shields 72JJ are wrapped loosely around the intermediate housing 60JJ for reflecting heat energy to prevent undesired heat loss. It is to be understood that the cavity 26JJ can be actively or passively thermally managed. The thermally-insulated particulate trap device 161JJ is located inside inner housing 21JJ and potentially includes a regeneration method of fuel-fired thermal assist or fuel additive chemical assist, to promote complete burning of the carbon particles and soot found in diesel exhaust.

In the foregoing description, those skilled in the art will readily appreciate that modifications may be made to the invention without departing from the concepts disclosed herein. Such modifications are to be considered as included in the following claims, unless these claims by their language expressly state otherwise.

What is claimed is:

1. A thermally-activated exhaust treatment device adapted to control exhaust emissions in a vehicle, comprising:
   an inner housing having a first inlet and a first outlet defining a longitudinal direction and having an exhaust treatment device therein chosen to reduce emissions from exhaust of a combustion engine as the exhaust passes from the first inlet to the first outlet;
   an outer housing enclosing the inner housing but characteristically not contacting the inner housing, the outer housing including a second inlet and a second outlet that align with the first inlet and the first outlet of the inner housing, the inner and outer housings including walls forming a sealed insulation cavity around the inner housing, the insulation cavity having a vacuum drawn therein; and
   an intermediate housing positioned adjacent to the inner housing that includes metal phase change material comprising an alloy including Zinc (Zn), Magnesium (Mg), and Aluminum (Al), wherein the metal phase change material includes by weight about 35% to 55% Zn by weight, about 35–55% Mg by weight, about 2%–20% Al by weight, and about 0–15% Si by weight.

2. The device defined in claim 1, wherein the metal phase change material has a eutectic temperature in a range of about 339° to 350°.

3. The device defined in claim 2, wherein the metal phase change material has a eutectic temperature of about 340°.

4. The device defined in claim 1, wherein the metal phase change material has a thermal expansion upon undergoing a phase change in the range of 5–8%.

5. The device defined in claim 1, wherein the exhaust treatment device includes a catalytic material.

6. The device defined in claim 1, including a salt phase change material, the metal and salt phase change materials being in contact with each other, but being immiscible and thus separate even after use of the device.

7. A thermally-activated exhaust treatment device adapted to control exhaust emissions from an internal combustion compression engine, such as a diesel engine, comprising:
   an inner housing having a first inlet and a first outlet defining a longitudinal direction and having an exhaust treatment device therein chosen to reduce emissions in exhaust of a diesel engine as the exhaust passes from the first inlet to the first outlet;
   an outer housing enclosing the inner housing but characteristically not contacting the inner housing, the outer housing including a second inlet and a second outlet that align with the first inlet and the first outlet of the inner housing, the inner and outer housings including walls forming a sealed insulation cavity around the inner housing, the insulation cavity having a vacuum drawn therein; and
   a thermal management system operably connected to the insulation cavity that is constructed to control heat flow from the inner housing to maximize the time the exhaust treatment device is within a predetermined optimum temperature operating range that includes a first phase change material that operates at an upper limit and a second phase change material that operates at a lower limit and that is in contact with but immiscible with the first phase change material so that the first and second phase change materials maintain distinct phase change characteristics from each other over a life of the treatment device.

8. The device defined in claim 7, wherein the first phase change material comprises metal phase change material and the second phase change material comprises salt phase change material.

9. The device defined in claim 8, wherein the metal phase change material has a eutectic temperature in a range of about 339° to 350° C.

10. The device defined in claim 9, wherein the metal phase change material has a eutectic temperature of about 340° C.

11. The device defined in claim 7, wherein the inner housing of the exhaust treatment device is shaped and configured to form a particulate trap device.

12. The device defined in claim 7, wherein the predetermined optimum temperature operating range is between about 200° C. for the lower limit and 400° C. for the upper limit.

13. The device defined in claim 7, wherein the predetermined operating range is between about 250° C. to 310° C. at the lower and upper limits, respectively.

14. The device defined in claim 7, wherein the thermal management system comprises an active thermal control system.

15. The device defined in claim 14, wherein the active thermal control system includes an electrical circuit and an electrically heated metal hydride.

16. The device defined in claim 14, wherein the active thermal control system includes a coolant actively removing heat.

17. The device defined in claim 7, wherein the thermal management system comprises a passive thermal control system.

18. The device defined in claim 17, wherein the passive thermal control system includes passive air cooling fins attached to the outer housing.

19. The device defined in claim 17, wherein the passive thermal control system includes passively heated metal hydride.

20. The device defined in claim 7, wherein the exhaust treatment device includes a catalytic material.

21. The device defined in claim 7, wherein the exhaust treatment device includes a particulate trap device.

22. A thermally-activated exhaust treatment device adapted to control exhaust emissions in a vehicle, comprising:

an inner housing having a first inlet and a first outlet defining a longitudinal direction and having an exhaust treatment device therein chosen to reduce emissions from exhaust of a combustion engine as the exhaust passes from the first inlet to the first outlet;

an outer housing enclosing the inner housing but characteristically not contacting the inner housing, the outer housing including a second inlet and a second outlet that align with the first inlet and the first outlet of the inner housing, the inner and outer housings including walls forming an insulation cavity around the inner housing; and an intermediate housing positioned adjacent to the inner housing that includes metal phase change material comprising an alloy including Zinc (Zn), Magnesium (Mg), and Aluminum (Al), wherein the metal phase change material includes by weight about 35% to 55% Zn by weight, about 35–55% Mg by weight, about 2%–20% Al by weight, and about 0–15% Si by weight.

23. The device defined in claim 22, including a salt phase change material, the metal and salt phase change materials being in contact with each other, but being immiscible and thus separate even after use of the device.

24. A thermally-activated exhaust treatment device adapted to control exhaust emissions from an internal combustion compression engine, such as a diesel engine, comprising:

an inner housing having a first inlet and a first outlet defining a longitudinal direction and having an exhaust treatment device therein chosen to reduce emissions in exhaust of a diesel engine as the exhaust passes from the first inlet to the first outlet;

an outer housing enclosing the inner housing but characteristically not contacting the inner housing, the outer housing including a second inlet and a second outlet that align with the first inlet and the first outlet of the inner housing, the inner and outer housings including walls forming an insulation cavity around the inner housing; and a thermal management system operably connected to the insulation cavity that is constructed to control heat flow from the inner housing to maximize the time the exhaust treatment device is within a predetermined optimum temperature operating range that includes a first phase change material that operates at an upper limit and a second phase change material that operates at a lower limit and that is in contact with but immiscible with the first phase change material so that the first and second phase change materials maintain distinct phase change characteristics from each other over a life of the treatment device.

* * * * *